US008848242B2

(12) United States Patent
Roy et al.

(10) Patent No.: US 8,848,242 B2
(45) Date of Patent: Sep. 30, 2014

(54) SYSTEM AND METHOD TO IMPLEMENT SHARING OF PAPER DOCUMENTS USING VIRTUAL CURRENCY

(75) Inventors: Shourya Roy, Challaghatta (IN); Divya Padmanabhan, Nagadevanahalli (IN); Jutta Williamowski, Meylan (FR); Antonietta Grasso, Meylan (FR); Yves Hoppenot, Meylan (FR)

(73) Assignee: Xerox Corporation, Norwalk, CT (US)

( * ) Notice: Subject to any disclaimer, the term of this patent is extended or adjusted under 35 U.S.C. 154(b) by 236 days.

(21) Appl. No.: 13/600,613

(22) Filed: Aug. 31, 2012

(65) Prior Publication Data

US 2014/0063514 A1  Mar. 6, 2014

(51) Int. Cl.
*G06K 15/02* (2006.01)

(52) U.S. Cl.
USPC .......... 358/1.9; 358/1.13; 358/1.15; 358/1.16; 709/203; 709/231

(58) Field of Classification Search
None
See application file for complete search history.

(56) References Cited

U.S. PATENT DOCUMENTS

| | | | |
|---|---|---|---|
| 5,706,452 A | 1/1998 | Ivanov | |
| 6,860,422 B2 | 3/2005 | Hull et al. | |
| 7,357,300 B2 | 4/2008 | Hull et al. | |
| 7,424,974 B2 | 9/2008 | Hull et al. | |
| 2007/0019237 A1* | 1/2007 | Nobutani | 358/1.15 |
| 2008/0005195 A1* | 1/2008 | Li | 707/203 |
| 2008/0288366 A1* | 11/2008 | Schonbucher et al. | 705/27 |
| 2009/0260068 A1* | 10/2009 | Hariharan et al. | 726/7 |
| 2010/0214064 A1 | 8/2010 | Shrader | |
| 2013/0346172 A1* | 12/2013 | Wu | 705/14.16 |

* cited by examiner

*Primary Examiner* — Miya J Cato
(74) *Attorney, Agent, or Firm* — Novel IP

(57) ABSTRACT

The application discloses systems and methods for physically sharing a hard copy of a document. The systems and methods include presenting to a user a graphical user interface having printing options for printing the document, where the graphical user interface has an input for receiving an indication by the user that the user is willing to share the hard copy of the document; presenting to the user options for defining characteristics of the hard copy of the document in response to receiving the indication; and publishing at least one of the defined characteristics within a profile page of the user.

20 Claims, 8 Drawing Sheets

| Action | A | B | C | D |
|---|---|---|---|---|
| Round -1: A prints | 100 | 0 | 0 | 0 |
| Round 2: A->B | 50 | 50 | 0 | 0 |
| Round 3: B->C | 12 | 12 | -25 | 0 |
| Round 4: C->D | 4 | 4 | 4 | -12 |
| Round 5: D->A | -6+ (6/4)=-5 | 1 | 1 | 1 |
| Net | -39 | -33 | -20 | -11 |

FIG. 7

SYSTEM AND METHOD TO IMPLEMENT SHARING OF PAPER DOCUMENTS USING VIRTUAL CURRENCY

FIELD

The present application discloses document management systems and methods. More particularly, the present application relates to a network-based portal that enables the efficient physical sharing of paper documents among workers in organizations for making organizations environment-friendly.

BACKGROUND

Even though organizations strive to reduce the consumption of paper, a huge number of documents are printed everyday within the organizations. People have shown a propensity for reading and working on documents in paper form rather than on a computer screen. According to one estimate, an average office worker in the United States prints approximately 10,000 sheets per year, i.e. approximately 40 pages per working day. Hence, paper remains an important part of the work environment in most organizations, despite the array of options available for reviewing information in electronic form.

With increasing awareness regarding the environmental deterioration caused by the excessive consumption of paper, organizations are striving toward reducing paper consumption and waste, while not putting undue restrictions on documents printing and compromising worker efficiency.

According to one estimate, nearly half of the documents printed in an organization are for one time use only. This estimate applies to non-private documents, namely documents which are amenable to sharing between workers, as well. Examples of such non-private or sharable documents that are usually printed by more than one employee in an organization include emails sent to all employees regarding policies of the organization, quarterly project updates published on the Intranet of the organization, an informative article based on a topic of interest for all employees, policy memoranda, among other examples. Printed copies of these documents are short-lived and can easily be shared. Hence, systems and methods which enable the sharing of documents among people working in proximate locations, while still promoting worker efficiency and independence, are needed.

Presently, sharing and collaboration platforms are available for people who are in geographically different locations for sharing their ideas, reading preferences, and interests, among other topics. Co-pending U.S. patent application Ser. No. 13/042,217, entitled "Document Sharing Network" and owned by Applicant, discloses systems and methods for physically sharing a hard copy of a document. The systems and methods include presenting to a user a graphical user interface having printing options for printing the document, where the graphical user interface has an input for receiving an indication by the user that the user is willing to share the hard copy of the document, presenting to the user options for defining characteristics of the hard copy of the document in response to receiving the indication, and publishing at least one of the defined characteristics within a profile page of the user.

Even though such sharing and collaboration platforms have enabled improved communication between people throughout the world, there is still a need for an efficient social networking platform which is organization specific and which allows members of an organization to know what other members sitting in the same organizational space are reading, what documents they are amenable to sharing, and to which documents they are providing physical access.

Similarly, conventional electronic file sharing platforms, which enable the sharing of digital documents among people working at separate workstations, also fail to efficiently let people physically share their annotations, comments, highlights in non-editable document format like PDF, TIFF, or scanned copies of paper documents. For many individuals, paper documents remain more useful for detailed and thorough reading, highlighting, making notes, and sharing annotations with fellow knowledge workers. Hence, there is need for an improved collaborative platform for sharing paper documents. Further, many times the behavior of users in their printing is not motivated by environmental concerns. They may select, for example, to print on the closest printer, use default settings, or print a document multiple times during its creation, simply as a matter of convenience. Therefore, there is also a need for a system and method that promotes environment-friendly behavior by users of such devices and actively encourages members of an organization to share their paper documents, so that the number of documents printed in the organization is reduced and the wastage of paper is minimized.

SUMMARY

In one embodiment, the application discloses systems and methods for physically sharing a hard copy of a document. The systems include a computing device, such as a printer, server, or other device that has a non-volatile computer readable medium storing a plurality of programmatic instructions, wherein said programmatic instructions, when executed by a processor, cause a printer system to: monitor a print job for a document from one or more printers, wherein said print job is defined by a plurality of characteristics and wherein said print job is associated with an account of a first user; determine a cost for said print job based on the plurality of characteristics; debit the account of said first user by an amount equal to said cost; monitor a sharing of said document by the first user to a second user, wherein said second user has an account; credit a first portion of said cost back to the account of the first user; and debit a second portion of said cost from the account of the second user.

Optionally, the first portion of said cost is equal to half of the cost and the second portion of said cost is equal to half of the cost. The plurality of characteristics includes at least one of a number of pages, a description of colors used, or a print resolution.

Optionally, the programmatic instructions, when executed by a processor, further cause a printer system to: monitor a sharing of said document by the second user to a third user, wherein said third user has an account; credit a third portion of said cost back to the account of the first user; credit a fourth portion of said cost back to the account of the second user; and debit a fifth portion of said cost from the account of the third user. The first portion of the cost plus the third portion of said cost is equal to one quarter of the cost. The second portion of the cost plus the fourth portion of said cost is equal to one quarter of the cost. The fifth portion of the cost is equal to one half of the cost.

Optionally, the account of the first user and the account of the second user comprise a plurality of points, wherein said points are increased or decreased based upon said crediting or debiting of cost. The programmatic instructions, when executed by a processor, cause a printer system to debit an account of a user whenever said user receives the document shared by said first user or second user. The programmatic instructions, when executed by a processor, cause a printer system to credit an account of the first user and second user whenever said second user shares the document with another user. The programmatic instructions, when executed by a processor, cause a printer system to credit an account of the first user, and not said second user, whenever said first user shares the document with another user.

In another embodiment, the system comprises a non-volatile computer readable medium storing a plurality of programmatic instructions, wherein said programmatic instructions, when executed by a processor, cause a printer system to: receive a request for information about a print job from a first user having an account; determine a plurality of print characteristics for said print job; determine a cost of said print job; present to the first user with a calculation of a cost for said print job; monitor a print job for a document from one or more printers, wherein said print job is defined by a plurality of characteristics and wherein said print job is associated with the first user's account; debit the account of said first user by an amount equal to said cost; monitor a sharing of said document to a second user, wherein said second user has an account; credit a first portion of said cost back to the account of the first user; and debit a second portion of said cost from the account of the second user.

Optionally, the first portion of said cost is equal to half of the cost and the second portion of said cost is equal to half of the cost. The plurality of characteristics includes at least one of a number of pages, a description of colors used, or a print resolution.

Optionally, the programmatic instructions, when executed by a processor, further cause a printer system to: monitor a sharing of said document by the second user to a third user, wherein said third user has an account; credit a third portion of said cost back to the account of the first user; credit a fourth portion of said cost back to the account of the second user; and debit a fifth portion of said cost from the account of the third user. The first portion of the cost plus the third portion of said cost is equal to one quarter of the cost. The second portion of the cost plus the fourth portion of said cost is equal to one quarter of the cost. The fifth portion of the cost is equal to one half of the cost.

Optionally, the account of the first user and the account of the second user comprise a plurality of points, wherein said points are increased or decreased based upon said crediting or debiting of cost. The programmatic instructions, when executed by a processor, cause a printer system to debit an account of a user whenever said user receives the document shared by said first user or second user. The programmatic instructions, when executed by a processor, cause a printer system to credit an account of the first user and second user whenever said second user shares the document with another user. The programmatic instructions, when executed by a processor, cause a printer system to credit an account of the first user, and not said second user, whenever said first user shares the document with another user.

In another embodiment, the system comprises a non-volatile computer readable medium storing a plurality of programmatic instructions, wherein said programmatic instructions, when executed by a processor, cause a printer system to: monitor a print job for a document from one or more printers, wherein said print job is defined by a plurality of characteristics and wherein said print job is associated with an account of a first user; debit the account of said first user by an amount equal to said cost; monitor a communication from a second user to a third user, wherein said communication directs the third user to obtain the document from the first user and wherein said second user has an account; monitor a sharing of said document from the first user to the third user, wherein said third user has an account; credit a first portion of said cost back to the account of the first user; credit a second portion of said cost to the account of the second user; and debit a third portion of said cost from the account of the third user. Optionally, the second user has not printed the document, is not in possession of the document, and does not receive the document.

Optionally, the first portion of said cost is equal to less than half of the cost and the second portion of said cost is equal to less than the first portion and wherein the first portion plus the second portion is equal to half of the cost. The third portion of said cost is equal to half of the cost. The plurality of characteristics includes at least one of a number of pages, a description of colors used, or a print resolution.

Optionally, the account of the first user and the account of the second user comprise a plurality of points, wherein said points are increased or decreased based upon said crediting or debiting of cost. The programmatic instructions, when executed by a processor, cause a printer system to debit an account of a user whenever said user receives the document shared by said first user or second user. The programmatic instructions, when executed by a processor, cause a printer system to credit an account of the first user and second user whenever said second user shares the document with another user. The programmatic instructions, when executed by a processor, cause a printer system to credit an account of the first user, and not said second user, whenever said first user shares the document with another user.

The aforementioned and other embodiments of the present shall be described in greater depth in the drawings and detailed description provided below.

BRIEF DESCRIPTION OF THE DRAWINGS

These and other features and advantages will be appreciated as they become better understood by reference to the following Detailed Description when considered in connection with the accompanying drawings, wherein:

FIG. 7 illustrates another exemplary interface screen of a portal, with updates from a user's friends who have shared documents;

DETAILED DESCRIPTION

Figure 1A:
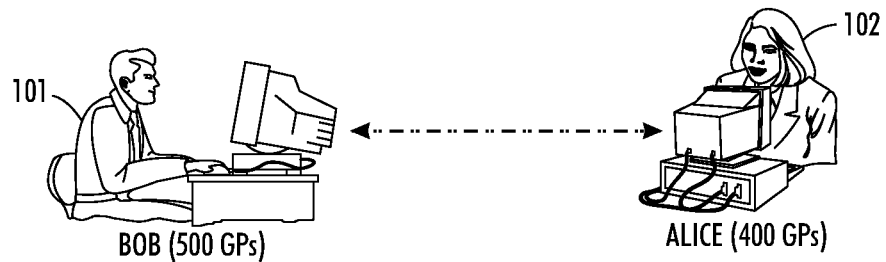
FIG. 1 is a flowchart illustrating an interaction between physical document sharing and a virtual currency and reward system.

The present application discloses multiple embodiments. The following disclosure is provided in order to enable a person having ordinary skill in the art to practice the claimed inventions. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present application is to be accorded the widest scope encompassing numerous alternatives, modifications and equivalents consistent with the principles and features disclosed. For purpose of clarity, details relating to technical material that is known in the technical fields related to the claimed inventions have not been described in detail so as not to unnecessarily obscure the disclosure.

In one embodiment, the present application discloses a network-based portal that enables sharing of paper documents among knowledge workers in organizations. In a further aspect, a "green" currency is established which is used to reward users for sharing of paper documents and reducing print usage. The exemplary "green" currency is a virtual currency in that it is stored electronically in each user's green currency account. The account can be stored in memory, e.g., of a computing device, such as a server or network computer, or of a memory storage device, such as a stored value card. The account can be added to and/or subtracted from. In other embodiments, the green currency can be further represented in tangible form, such as paper coupons, tokens, or the like.

The exemplary embodiment is described in terms of a network printing system, in which print jobs can be selectively directed from a workstation to one of a group of shared devices. The network devices are typically printers, copiers, or multifunction devices (MFDs), such as those with printing, copying and optionally faxing and email capability. Green currency is consumed, based on printer usage. It is to be appreciated, however, that the green currency is also applicable to the use of other shared resources where users have a choice as to how much use to make of the resource, while still performing their required job functions efficiently.

The term "printer," as used herein, broadly encompasses various printers, copiers, facsimile, bookmaking machines, or multifunction machines, xerographic or otherwise, unless otherwise defined, which performs a print job rendering function for any purpose.

A "printer network," as used herein, comprises one or more shared devices, which are accessible to one or more workstations, such as personal computers, over a wired or wireless network.

The term "print medium" generally refers to a physical sheet of paper, plastic, cellulose, wood-based product, or other suitable physical print media substrate for images, whether precut or web fed.

A "print job" generally includes a "printing object," which consists of one or more document images in a suitable format that is recognized by the printer, e.g., Postscript, together with a "job ticket," which provides information about the print job that will be used to control how the job is processed.

For purposes of this application, the term "portal" shall mean an electronic graphical user interface, accessible via a display in data communication with a computing device, which provides a user with access to certain of the physical paper sharing methods, processes, features or functionality disclosed herein. For purposes of this application, the term "profile page" shall refer to data that is intended to be processed and displayed by a computing device and that is specific to an individual user and modifiable by that individual user. For purposes of this application, the term "social network" comprises a plurality of profile pages, at least some of which are in data communication with each other and serve to place individuals associated with the profile pages in communication with each other in accordance with one or more predefined rules.

For purposes of this application, the term "organization" shall mean any group of people who wish to selectively share physical documents within the members of that group. For purposes of this application, the term "user-controllable feature" shall mean a software feature that may be activated, controlled, or otherwise used by a person interacting with the portal. For purposes of this application, the term "shared document" or "shareable document" shall mean a physical document which is designated, via the portal, as being available for physical transfer from the possession of one user to the possession of another user or which has been physically transferred from the possession of one user to the possession of another user. For purposes of this application, a "hard copy of a document" is any human readable data, including text, graphics, alphanumeric strings, or other representations, printed on any form of physical paper.

The system of present application makes organizations greener by reducing print usage and facilitating sharing of paper documents. The system guides its users towards greener print behavior by reducing unnecessary prints and optimizing print settings. Concurrently, it provides a collaborative framework for sharing paper documents and building up communities facilitating the sharing process.

For this purpose, the system intercepts all print jobs, to observe and track users' print behavior, to analyze their evolution over time and to compare them with others in order to identify bad printing habits and possible room for improvements. In this aspect, the system introduces a virtual currency, referred to as Greenpoints (GP), and computes a cost in terms of GPs for each printed document. The system's allocation of GPs to one or more users is intended to correspond to the environmental cost of a user's printing activities. This cost is computed based on the characteristics of the print job, such as length of a document, its content, the selected print settings, the fonts used, and the type and extent of color used, among other variables. One of ordinary skill in the art would appreciate that Greenpoints do not necessarily reflect a true 'carbon footprint' calculation or pure $CO_2$ consumption calculation of a print job. Rather, the virtual currency is intended to be incremented or decremented according to whatever value assessment the organization wishes to assign to various aspects of printing activities which are environmentally significant and which the individual employee can influence. The exemplary system and method are sufficiently flexible to allow a corporation or other entity to devise a virtual green currency motivating its employees to improve their environmental behavior in printing.

In one embodiment, the units or "points" of the exemplary green currency are awarded to and/or subtracted from users' accounts in amounts based on their behavior, which is tracked by the system. For example, a user may be awarded a certain number of green points in a given time period, such as for a month, which are lost or gained as the user makes choices about printing and sharing. In one embodiment, a user who spends less GPs than an average user over a period of time is assumed to have made printing choices which, relative to the average user, caused less damage to the environment and, therefore, is associated with more green print behavior by the user. In another embodiment, a user who spends more GPs than an average user over a period of time is assumed to have made printing choices which, relative to the average user, caused more damage to the environment and, therefore, is associated with less green print behavior by the user.

Residual points at the end of the time period may be carried over to the next time period and/or may have a fixed lifetime, after which they automatically expire. In some embodiments, green points may be awarded for desirable behavior. Unlike other points-based systems, however, users are generally rewarded for their lack of consumption rather than for their consumption of goods or services. The exemplary green points can be saved or traded. In one embodiment, saved green points can be traded for various types of rewards, including recognition within the organization. This increases the motivation for the users to improve their print behavior.

Thus, if a user wants to read a paper copy of a document, she has to print the document by spending green points. Having to expend green points will incentivize a user to search for another user who has an already printed copy of the document and use the same copy, if available, to avoid having to expend those points. To facilitate this, the system provides a social networking portal for sharing paper documents among users within an organization, such as knowledge workers in offices, universities, schools, government institutions, and other locations. The portal provides a collaborative and sharing platform that enables users to specify the documents that they own and the ones they are looking for. An exemplary system is disclosed in co-pending U.S. patent application Ser. No. 13/042,217, entitled "Document Sharing Network" and owned by Applicant, and is herein incorporated by reference.

Thus, the whole community is made aware of the documents available and of those searched for. Individuals can then request particular documents of interest to them from one another. This is particularly incentivizing given that documents which might have been difficult to obtain otherwise become easily accessible. For example, requesting presentations from colleagues on a given topic is far easier than searching for all the information from scratch. However sharing of paper documents is not as easy as sharing of electronic documents, and it may also not be very appealing due to issues like aging of paper documents. This might prevent people from using the sharing portal and result in reprinting instead. Here an explicit reward or gain for sharing documents in terms of green points motivates users to more actively share their physical documents. By sharing, the printing cost (in terms of green points) which was attributed to the user who issued the print job also gets shared among the group members with whom the document is physically shared.

The present system automatically publishes information about printed documents on the portal, thus making the physical print outs directly available to the whole user community. Users are motivated to actually share their print outs, and to share printing costs with their colleagues by means of a reward mechanism that allows them recover part of the GPs they initially spent for printing. In one embodiment, the reward mechanism is extended to sharing of traditional paper documents, that is, documents not printed by the user such as books. Furthermore, users are also rewarded with green points by suggesting sources of documents to other users for sharing.

Thus, users can gain back some of the GPs they had spent for printing by sharing physical documents with others. Users who reuse already printed documents also lose less GPs compared to situations where they chose to print the same document. Both previous and new possessors of documents are benefitted in terms of GPs, while minimizing overall GP consumption in the organization.

The reward system also includes a mechanism to earn GPs by suggesting "sources of documents" to people. Thus, when a user suggests the owner of a document to a person who is looking for that document, the user can gain a fraction of the GP spent in originally printing that document. This recognizes the user's contribution to reducing printing, by facilitating reuse of already printed documents. In this manner, the owner of the document who shares it, as well as the user who suggested the source of the document stand to earn some fraction of the GP.

Figure 1B:
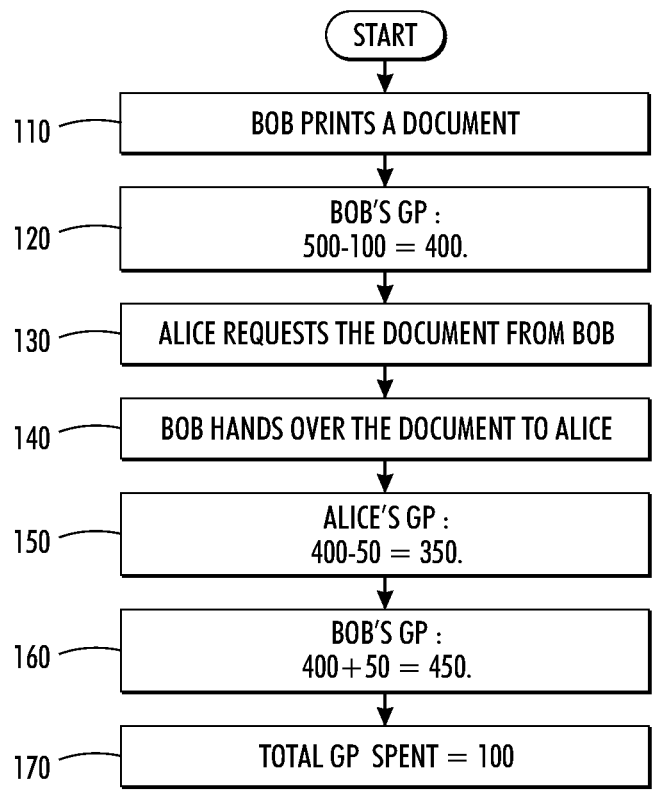

FIG. 1 illustrates the allocation of virtual currency and the reward system of the present application with an example of two users in an organization. Referring to FIG. 1, two users in an organization, Bob and Alice, use the document sharing portal of the present application. Each user is allocated a fixed number of GPs periodically (such as every day, week, month, quarter, or year), which they consume through their printing activities. Any leftover GPs can be carried forward, and a positive balance of GPs is subsequently rewarded. In the present example, the system has associated with Bob's user account a balance of 500 GPs and has associated with Alice's user account a balance of 400 GPs. It should be appreciated that the system stores GP values for each user in a non-volatile memory, such as a database, associated with a computing device, such as a server. The GP values are associated with each user's account through any number of data structures, such as tables or flat file structures.

Referring to FIG. 1, Bob prints a document 110. The system, which monitors all printing activity, detects Bob's requested print job and determines a plurality of characteristics associated with that print job, including number of pages, extent of colors used, print resolution, and/or any other characteristics that define a print job and/or are related to physical resource consumption, such as paper, printer ink, or energy.

Based on the determined characteristics, the system determines an amount by which to decrease 120 Bob's GP value, as associated with his user account, thereby resulting in a loss of GPs from Bob's account. Thus, for example, if the system determines that the document printed by Bob has an associated GP value of 100, this amount is subtracted from Bob's GP balance. Therefore, after printing, Bob's GP is:

$$500-100=400.$$

Using the present system, Alice, who needs the same document, searches for the document, determines that Bob possesses it, and, accordingly, requests Bob to borrow it 130. In one embodiment, Alice can predetermine the GP cost of printing a document before deciding to actually print the document. For example, an icon can be presented within a conventional print interface which, when activated, will calculate a GP cost of a print job based on the print characteristics detected via the conventional print interface and present that GP cost to a user before the user actually prints the document.

Having used the system to contact Bob and request the document, Bob hands the physical document to Alice, or otherwise makes it available to Alice 140. Bob and/or Alice uses the system to confirm physical receipt of the document from Bob. The system then allocates some portion of the formerly decremented GP points back to Bob's account 160 and subtracts that same portion from Alice's account 150. Accordingly, Bob gains some GP points by sharing the physical document and Alice loses less GP value by sharing the document than she would have by printing it herself. For example, Alice loses only half of the GPs attributed to printing the document, or 50 GPs, compared to 100 GPs, resulting in Alice's GP balance being 400−50=350, while Bob gains back half the GPs he lost for printing the document, or 50 GPs, resulting in Bob's GP balance being 400+50=450. Reflecting the actual physical resource use, the total GPs spent for the original print activity remains 100, when the document was printed, 170.

Figures 2, 3:
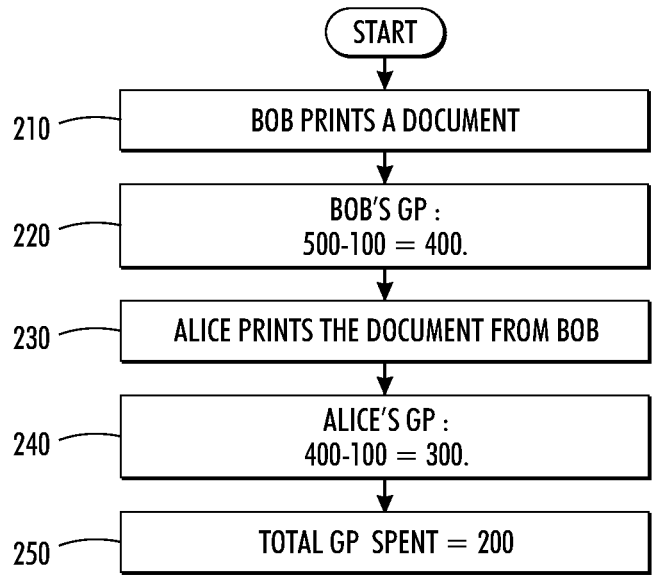
FIG. 2 is a flowchart illustrating an exemplary scenario where two users do not share a document.
FIG. 3 illustrates a use of virtual currency for document sharing when applied to a larger network.

FIG. 2 illustrates the scenario, if Bob and Alice do not share the document. In this example, Bob and Alice again start with a GP balance of 500 and 400, respectively. Referring to FIG. 2, Bob prints a document in step 210. This results in loss of 100 GPs from Bob's account as shown in step 220, and after printing, Bob's GP is:

500−100=400.

Now Alice, who needs the same document, also prints it instead of borrowing from Bob, as shown in step 230. This results in a loss of 100 GPs from Alice's account as well. Thus, after printing, Alice's GP is:

400−100=300.

This is shown in step 240.
In this case, total GP spent=100+100=200, as shown in step 250.

Thus the GPs spent when a document is shared are less than the GPs spent when everyone prints their own copy. By sharing, all the parties improve their green point scores, as they consume lesser green points. This signifies lesser environmental cost since the number of copies of a document in the network is reduced.

The process of sharing a document can go on and on. Each time a document is transferred, the new owner loses some points. This same amount is equally distributed among all the previous owners of the documents and they earn some points. The same is illustrated by means of the following equations:

$$GP\_loss = G/2 \quad (1)$$

If there have been no users who have suggested another user source for the document:

$$GP\_gain\_past\_owner = (G/2)*(1/N) \quad (2)$$

If a user has suggested another user source for the document:

$$GP\_gain\_past\_owner = (G/2)*(2/3)*(1/N) \quad (3)$$

$$GP\_gain\_suggestor = (G/2)*(1/3)*(1/S) \quad (4)$$

Where G=Greenpoints associated to a document at the instant when it is shared, at a moment prior to sharing, or at a moment after sharing;
GP_loss=Greenpoints lost by the user who receives the document in the current round;
GP_gain_past_owner=Greenpoints gained by a user who had owned the document in the past;
GP_gain_suggestor=Greenpoints gained by a user who had suggested the document's source (owner) to another user;
N=Number of past owners for the document; and
S=Number of source suggestors for the document.
The above mechanism ensures conservation of GP and prevents creating or losing GP without any action associated therewith.

FIG. 3 illustrates an application of the presently disclosed reward system when applied to a larger network. It shows an exemplary cyclic case where a past owner of the document ends up owning the document after several other transfers. FIG. 3 illustrates the GP balance of four users—A 310, B 320, C 330 and D 340, as a result of the printing and sharing choices they make. All four exemplary users start with a GP balance of zero. Referring to FIG. 3, in Round 1 301, user A 310 prints a document. If the document has an associated GP value of 100, user A loses 100 points, resulting in a GP balance of −100.

In Round 2 302, A 310 lends the paper document to B 320. Therefore, in accordance with equation (1) above, B loses 100/2=50 green points. At the same time, A gains 50 GPs, in accordance with equation (2). After round 2 302, the GP associated with the document reduces to 100/2=50, as the document is no longer 'fresh' and has moved hands once. In the next round—Round 3 303, B 320 lends the paper document to C 330. Therefore, in accordance with equations (1) and (2) above, C loses 25 green points. At the same time, A and B gain 12 GPs each. Now, the GP associated with the document becomes 50/2=25.

In the next round—Round 4 304, C 330 lends the paper document to D 340. Therefore, in accordance with equations (1) and (2) above, D loses 12 green points. At the same time, A, B and C gain 12/3=4 GPs each. The GP associated with the document is now 25/2=12. In the last round—Round 5 305, D 340 returns the paper document to A 310. Therefore, in accordance with equations (1) and (2) above, A loses 6 green points. At the same time, gain of 6 GP is shared between the previous owners, A, B, C, and D. Thus, A gains (6/4)~1 GP. B, C and D also gain 1 GP each. A loses 12/2=6 GP. The net effect of round 5 on A is a change in GP by (−6+1)=loss of 5 GP.

Thus at the end of 5 rounds of sharing, A gets a GP balance of −39, which would have been −100 had A not shared the document after printing. B, C, and D have a GP balance of −33, −20 and −11, respectively, while each of them would have had a balance of −100 if they printed their own copies.

Figure 4A:
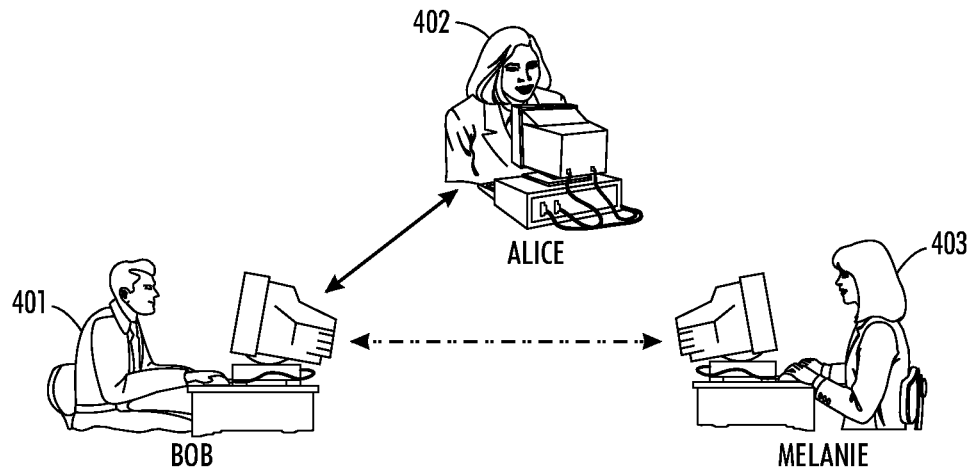
FIG. 4a is a chart illustrating an exemplary scenario where a user can earn reward points by suggesting the source of a document to other users.
Figure 4B:
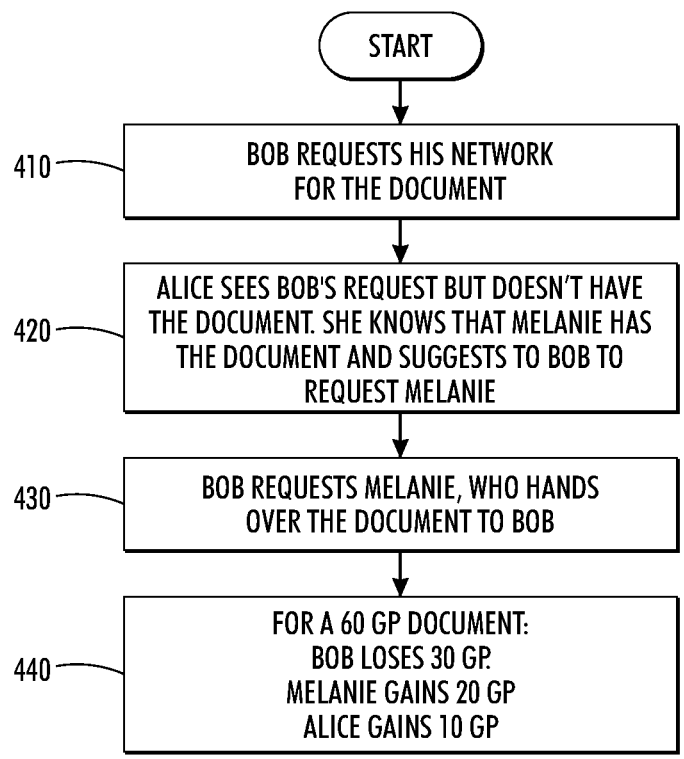
FIG. 4b is a flowchart illustrating an exemplary scenario where a user can earn reward points by suggesting the source of a document to other users.

In another embodiment, the present system allows users to actively earn green points, instead of simply trying to conserve from a fixed pool. In this embodiment, users can suggest the source of a document to other users, using the sharing portal. This feature is illustrated by means of an example in FIGS. 4a and 4b. Referring to FIG. 4a, three users in an organization Bob 401, Alice 402 and Melanie 403 use the document sharing portal of the present application. The process is explained in FIG. 4b, and starts with Bob inputting a request for a document he needs on the network through the portal 410. Alice sees Bob's request, but doesn't have the document. She, however, knows that Melanie has the document. Therefore Alice suggests Bob to request 420 the document from Melanie. Subsequently, Melanie shares 430 the document with Bob. In this example, the document has an associated GP value of 60. So, on borrowing the document, Bob loses 30 GPs, according to equation (1). Melanie gains 20 GPs for sharing the document with Bob, according to equation (3); and Alice gains 10 GPs for suggesting the source of document to Bob, according to equation (4). This is shown in step 440.

It may be appreciated that by suggesting sources of documents in the above manner, users are contributing towards document sharing and helping the organization to be greener. Therefore, they are rewarded with a fraction of the suggested document's GP value. This reward acts as a motivation for users to take initiative and facilitate sharing of documents between other users. It should further be appreciated that any allocation scheme can be used to allocate GPs between document sharers, sources, and suggesters.

The document sharing portal of the present application provides users with a plurality of user-controllable features such as print publishing, requirement publishing, automatic notification, discussion forums, and the ability to define interest, skill, or other topic-based communities. The print publishing feature enables a user to publish a list of shareable documents that they have printed and are willing to share by, within, or during a specific time period. This feature enables users to efficiently communicate their willingness to share one-time-prints with co-workers, eliminating repeat-prints and bringing down the overall consumption of paper. In various embodiments, the actual exchange/handover of printed shareable documents takes place physically between two users, after one user communicates to the other user the physical location of the desired shareable document.

The requirement publishing feature allows users to publish a requirement for a printed shareable document on the web portal. For example, before printing a shareable document, a user can actively publish a need for that document via the portal and, therefore, prompt other users for the shareable document before printing the document.

The automatic notification feature is used to notify a user if another user has, within a predefined time period, printed the same shareable document that is required by, or is about to be printed by, a user. In one embodiment, the automatic notification feature displays a list of people who have printed the shareable document of interest in descending order of age (i.e. when the shareable document was printed), or physical location (i.e. physical location of the shareable document), or whether the one or more people who have printed the document are part of the same network.

The discussion forums enabled by the present invention provide a discussion platform for users reading the same shared document(s), e.g. research paper(s). The portal also provides for the formation of user communities based on a plurality of variables, such as geographic proximity, interests, skill set, position within an organization, being assigned to the same workgroup, among other variables.

To encourage an organization's group members to sign up for the portal, the portal prompts users for identification information, location information and document reading preferences and thereafter generates a profile page, which may be accessed via one or more graphical user interfaces (GUIs). In one embodiment, the user may perform actions, such as print publishing, requirement publishing, automatic notification, discussion forums, and participating in communities, via the profile page.

It should be appreciated that the software-based user-controllable features described herein are accessed by a user by the user operating a computing device with a processor executing a plurality of programmatic instructions stored in a memory to receive data, transmit data, and display a graphical user interface representative of the portal. The user computing device is in data communication, either via a wired or wireless connection, to a network that comprises a computing device with a processor executing a plurality of programmatic instructions stored in a memory to enable the portal and associated user-controllable features. As used herein, the "computing device" is any device capable of accessing or displaying electronic data, including personal computers, laptops, desktops, mobile phones, tablet PCs, or other computers.

Figure 5:
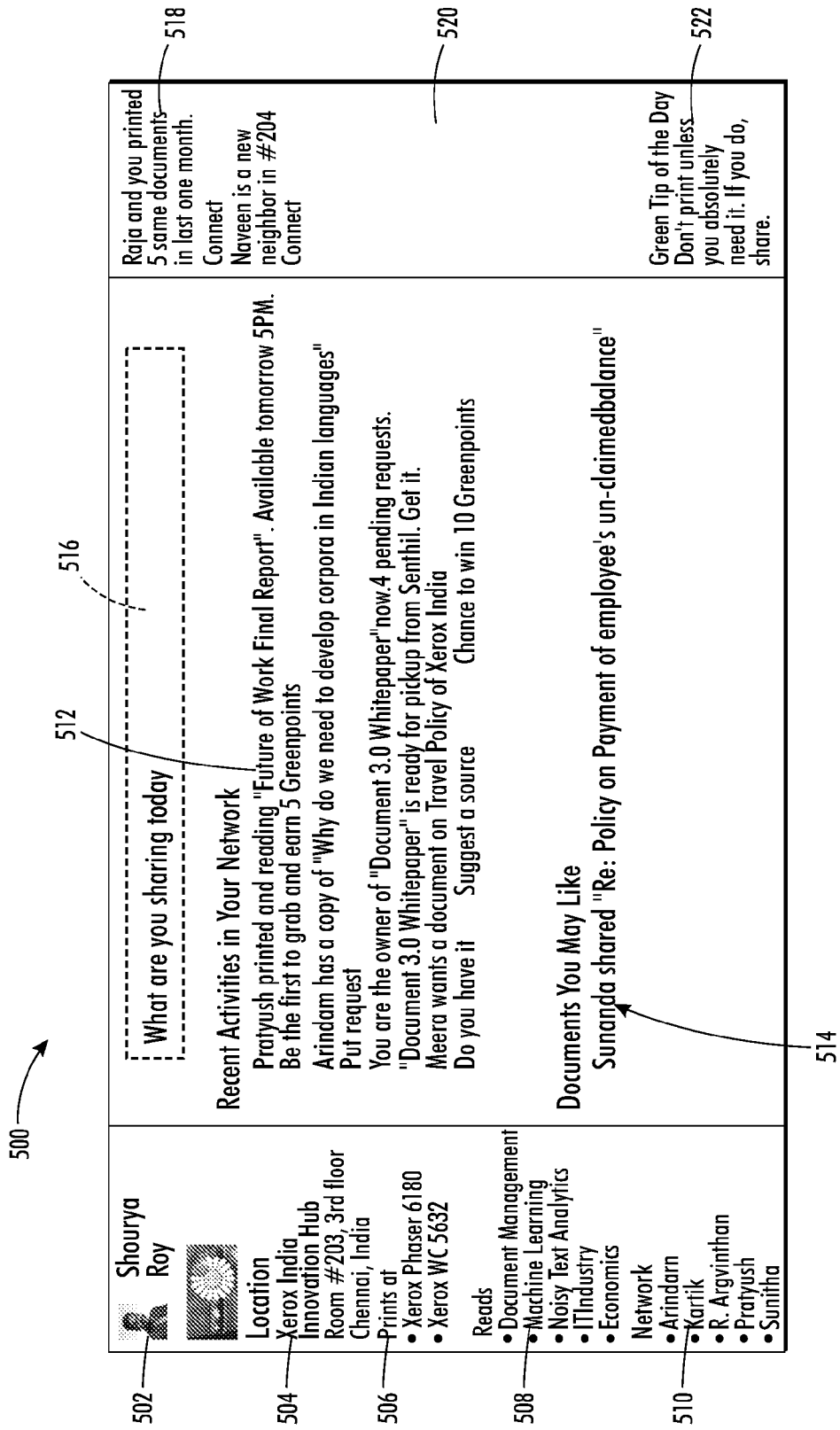
FIG. 5 illustrates an exemplary screenshot of a graphical user interface for accessing one embodiment of a document sharing portal.

FIG. 5 illustrates an exemplary user interface for accessing the portal, in accordance with one embodiment. Screenshot 500 comprises sections 502, 504, 506, 508, 510, 512, 514, 516, 518, 520, and 522. The information displayed is obtained from an underlying server module which is described with reference to FIG. 9.

Section 502 provides information regarding a user who has logged into the portal. In one embodiment, section 502 provides information such as a profile name of the user and/or a picture. Other information that the user has provided at the time of signing up for the portal may also be visible in section 502. Section 504 displays a location of the user along with the user's physical location within the organization. In various embodiments, location information such as a name of premises in which the user is located, a room number, a desk number, telephone number, extension number, fax number, email address, alternative social network identifiers, or other identifiers are displayed. The accuracy of the physical contact information displayed in section 504 is important to enable the efficient exchange or handover of shareable documents. The accurate location information of a user in possession of a shareable document must be displayed on the portal in order to enable other users to reach the location and obtain the document.

Section 506 displays the names of the one or more networked printers, if any, to which at least one of the user's computing devices is configured to output print jobs. In various embodiments, this information can be used by users to coordinate physical document transfer, such as designating areas near common networked printers at which to leave shareable documents.

Section 508 provides information regarding areas or topics of interest to the user. The portal provides a social networking platform for communicating areas of reading interest, as well as enabling the sharing of printed documents. Hence, section 508 provides user preference information that enables the formation of communities and groups. Other users having similar reading preferences or who are interested in the user's reading area may contact the user by using the location information displayed in section 504. In an embodiment, a user may network with one or more users by using the portal. The user may network with other users whose reading preferences or areas of interests overlap. Section 510 displays the names of individuals within the organization known to the user, either through a common forum, common community, common work group, prior physical exchanges, or one-to-one linking between the users. Such individuals are referred to as a "user network".

Section 512 displays a list of activities taking place within one or amongst the individuals within the organization who are known to the user. In one embodiment, exemplary user network activities comprise messages posted by members of the user network putting in a request for or stating the availability of a shareable document. The portal interface allows users to respond to the posted messages by following a link. For example, a message stating that a member of the user network has printed a shareable document and will make it available for others who are interested by the next day may be displayed, along with providing an option to the user to respond by putting in a request for the shareable document. Other exemplary messages comprise information that a user has a shared document, such as an old document or a document which the user had, for example, photocopied from a journal. Section 512 also displays information such as the number of pending requests for a document possessed by a user. Where a member of the user network has put in a request for a shareable document in possession of another user, a message can be sent to the member by the user or by other members of the user network specifying the location of the document. In one embodiment, the portal interface displays the Green Point (GP) value associated with activities of the user and other users in his/her network. For example, if one of the user's friends has put up a document for sharing, the portal displays the GPs associated with that document. The portal further makes suggestions by which the user can earn green points. For example, along with publishing an update about a document being shared by a friend, the portal can publish the GPs that the user might earn on borrowing that document (instead of printing), or on recommending it to someone else for borrowing.

Section 514 provides information regarding various activities happening outside the user network but which could potentially be of interest to the user. Section 516 enables users to publish the availability of one or more shareable documents in their possession. In one embodiment, section 516 comprises a textbox in which the user can type in titles of one or more documents available and ready to be shared. The information typed in the text box is published on profile pages (user interfaces) of all members of the user's network. In one embodiment, the entered information may be made available to all users who have signed up to the portal.

Section 518 provides recommendations to a user to connect with one or more individuals based on predefined criteria. For example, section 518 may provide a suggestion to connect with people because they are printing or reading similar documents or they are within a predefined geographical location. A user specific advertisement may be displayed in section 520. Section 522 displays awareness messages, helpful tips, policy announcements, or other additional communications to increase awareness among people towards sharing printed or being environmentally conscious.

In various embodiments of the present invention, a user may share printed documents by providing information regarding availability of the document to other user by inputting that information into the portal directly or through a print user interface that is integrated into the portal system. The user can directly publish the availability information with respect to a printed document by publishing the information on the profile page (via section 512 of FIG. 5). In that embodiment, a user inputs, via his computing device, the name, location, and other relevant information regarding the shareable document into the portal, which then displays that information throughout the user network.

Figure 6:
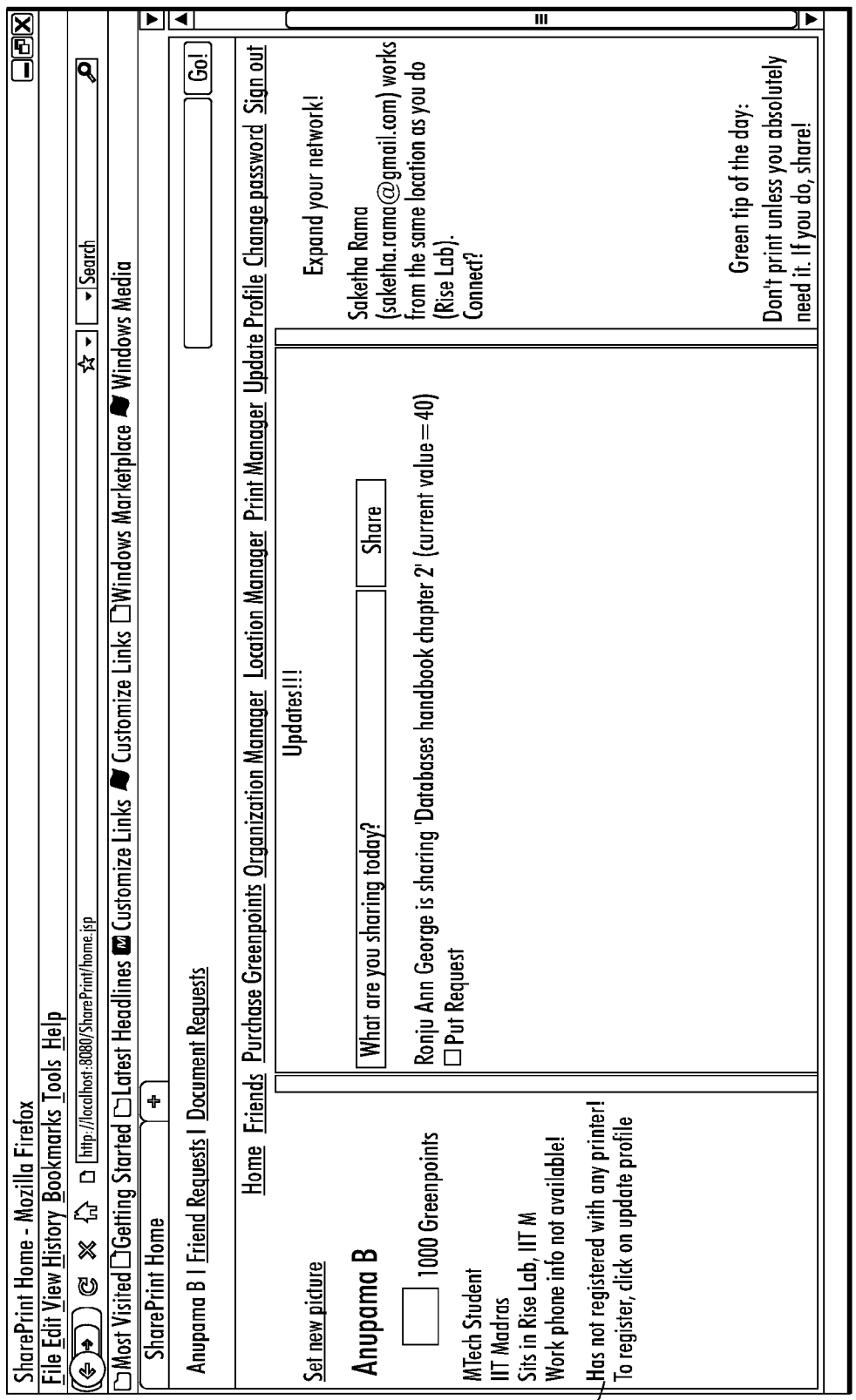
FIG. 6 illustrates another exemplary interface screen of a portal.

The portal also provides a mechanism for efficiently designating a document as being shareable by integrating the portal with a printer user interface, thereby providing users with the ability to designate shareable documents, or be informed of the existence of shareable documents, at the critically important moment when a user is in the process of printing a document. FIG. 6 illustrates another exemplary interface screen of the portal, wherein there is an option 610 provided to the user to register with any printer in their network. Registration links the user's profile page to the printer user interface.

Figure 7:
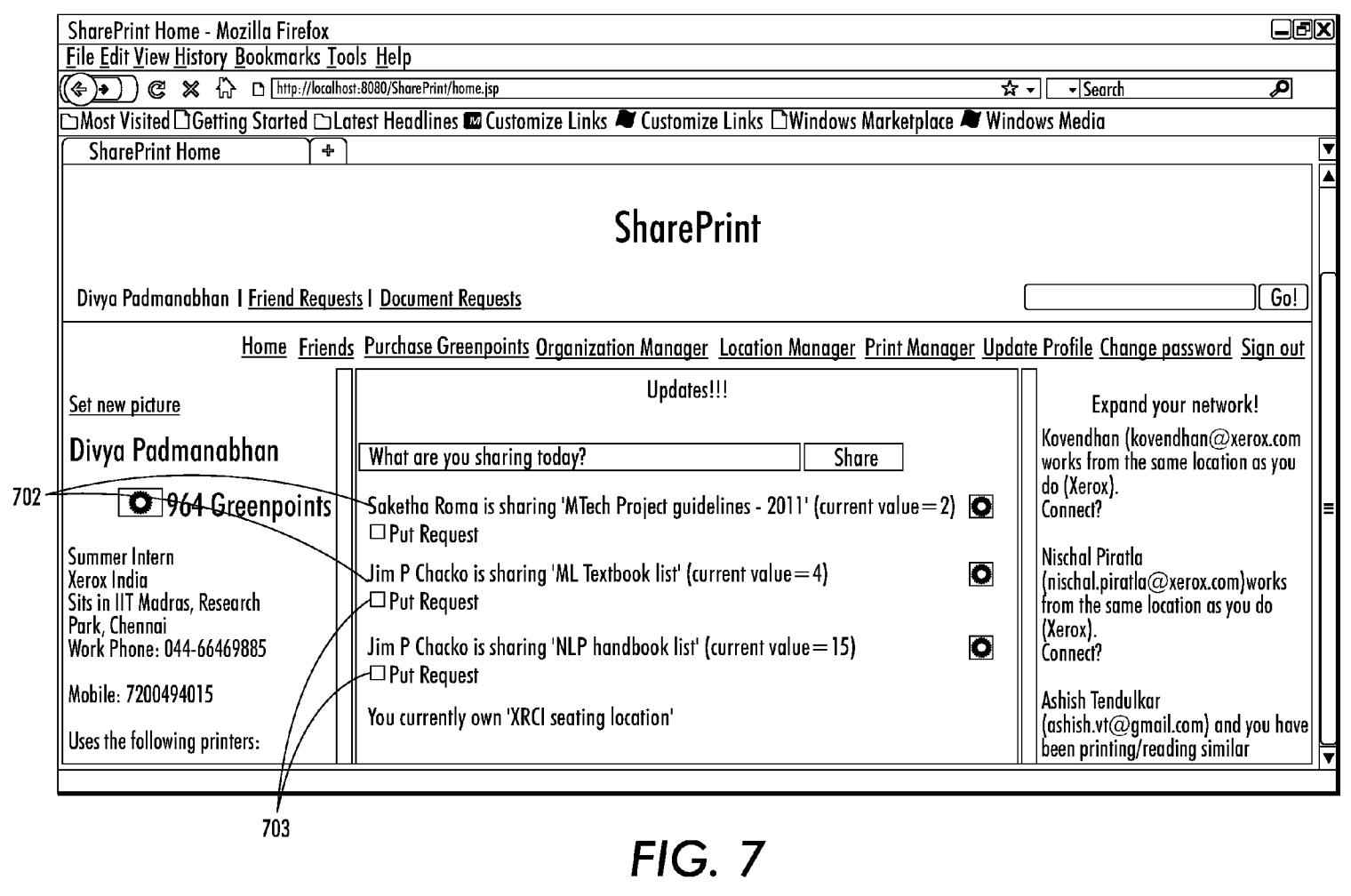

As explained above, via the portal interface users can explicitly share a document that could be printed or even otherwise—as in the case of photocopies or actual book etc. This update comes up as a notification in the user's friends' home pages, as shown in FIG. 7. Here, a user's home page shows various updates 701 corresponding to documents shared by the user's friends. Along with the update, a link 702 is provided so that the user can request the shared document.

In one embodiment, links 702 are accompanied by check boxes 703 to allow the user to put request for borrowing multiple documents. Once the provider user grants the document, a physical transfer of the document happens between the two users after which the owner of the document changes.

Figure 8:
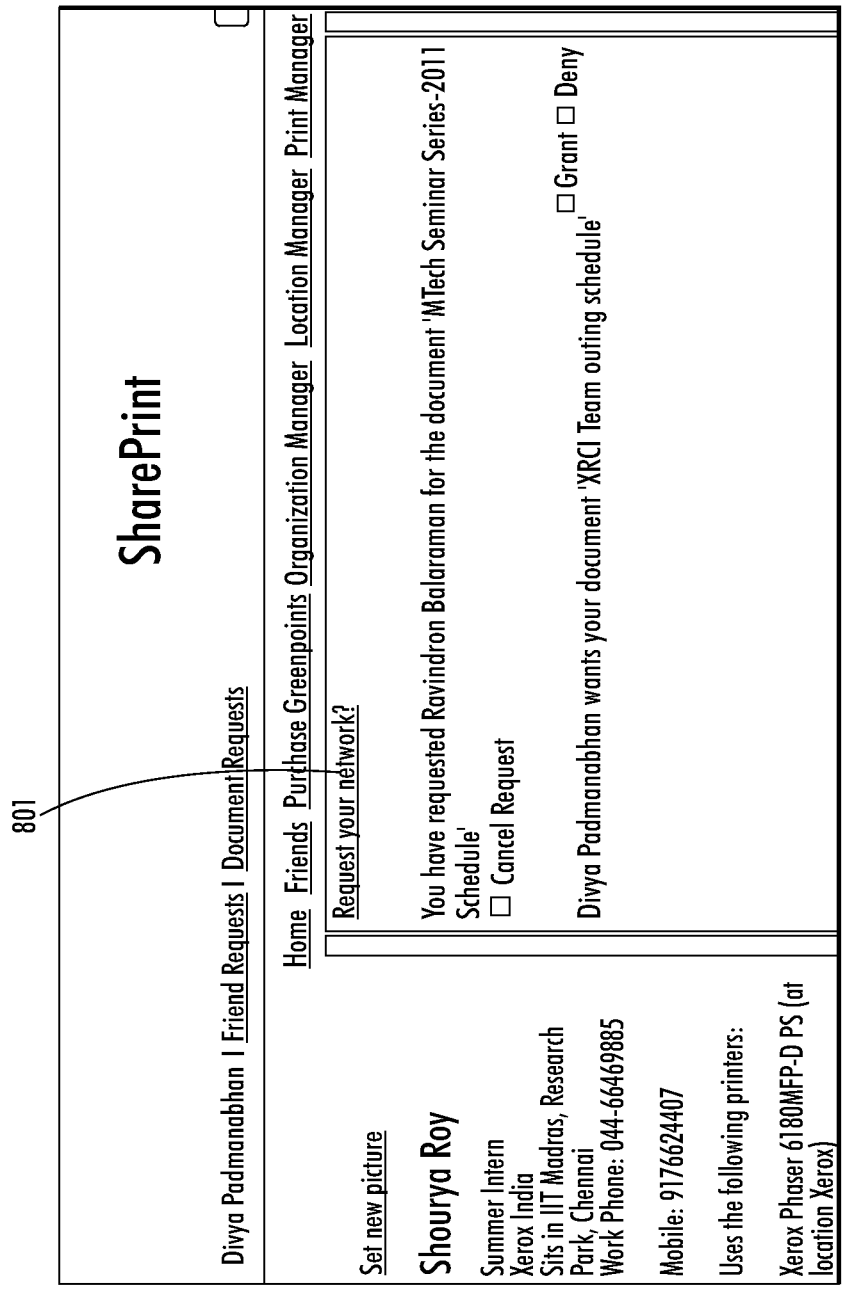
FIG. 8 illustrates another exemplary interface screen of a portal that allows a user to input a request for borrowing a document across his/her network.

In one embodiment, the portal interface provides the user with an option of requesting a document from individual users as well as from their entire network. As shown in FIG. 8, a 'Request your network' link 801 allows the user to put a request for borrowing the document across his/her network of friends connected through the portal.

Figure 9:
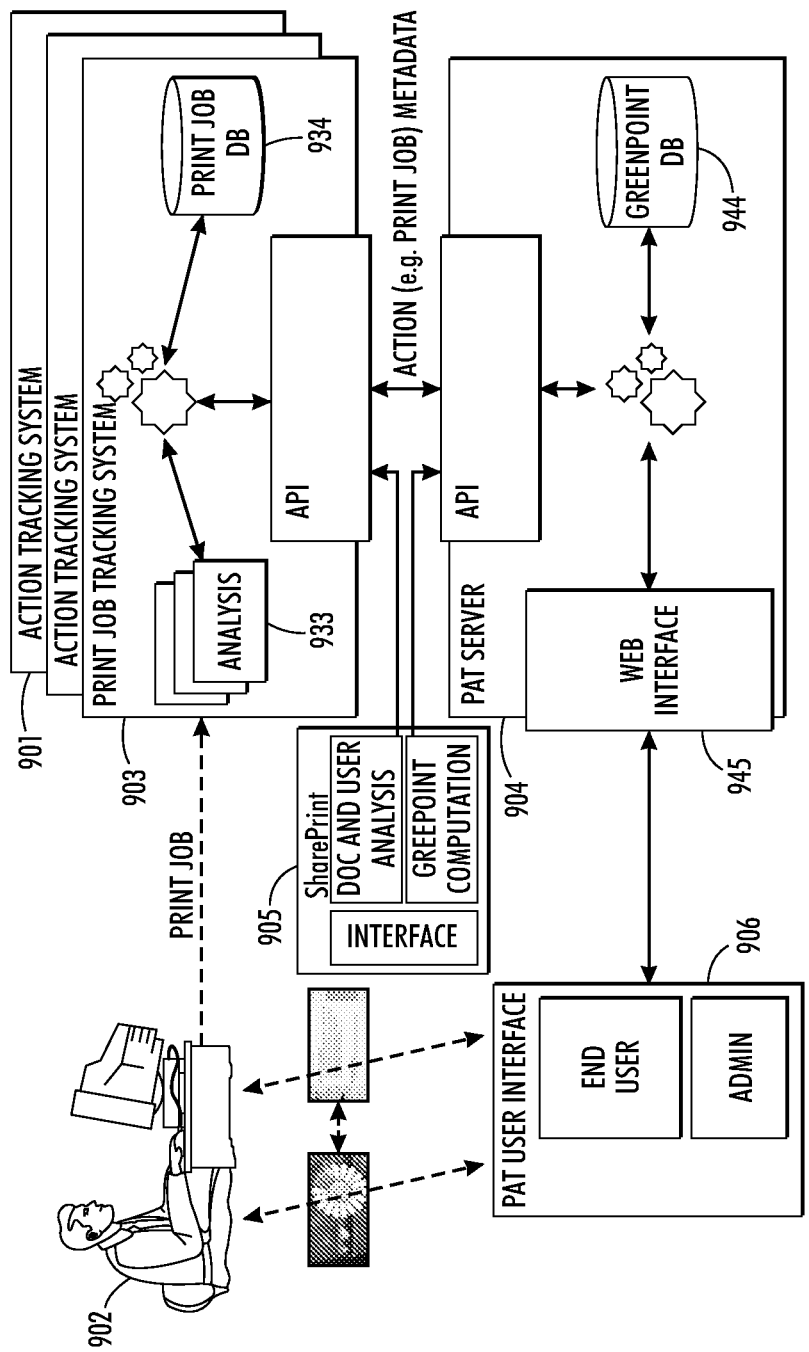
FIG. 9 illustrates a block diagram depicting an exemplary architecture of the network enabling the document sharing system.

FIG. 9 illustrates a block diagram depicting architecture of an exemplary network enabling the document sharing system. Referring to FIG. 9, an Action Tracking System 901 keeps track of the user's printing activity. When the user 902 prints a document, the print job is reported to the Print Job Tracking system 903, which is in communication with the user's workstation. The Print Job Tracking system 903 has an Analysis module 933 and a Print Job database 934. The Print Job database 934 stores metadata using which Green Points may be attributed to a print job depending on its characteristics, such as number of pages, Black & White or colored printing, printing on single side or both sides of the paper, etc. For example, for each colored page printed, the cost may be 10 Green points, while for each Black & White page it may be 5 Green points. Using this metadata, the Analysis module 933 analyzes the print job and ascribes the appropriate Green Points to it.

Print job metadata is communicated by the Print Job Tracking system to PAT (Personal Assessment Tool) Server 904. This server is coupled to a database 944 which is used to store Green Point balance information for all the users. PAT server 904 computes the current balance of green points and returns the results to the Shareprint server 905. The Shareprint server enables the document sharing portal and handles the jobs pertaining to the user activity, interactions, document requests etc. The Greenpoint information is also supplied to the user by means of a user interface 906, linked to the PAT server via a web interface 945.

Thus, the present application discloses a way to share paper documents leading to reduced paper consumption and increased intra-organization collaboration. The present system can be easily connected with other collaborative platforms, both intra-organization as well as public. The portal can be extended to sharing of any paper based materials like journals, magazines, or books.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A non-volatile computer readable medium storing a plurality of programmatic instructions, wherein said programmatic instructions, when executed by a processor, cause a printer system to:
    Monitor a print job for a document from one or more printers, wherein said print job is defined by a plurality of characteristics and wherein said print job is associated with an account of a first user;
    Determine a cost for said print job based on the plurality of characteristics;
    Debit the account of said first user by an amount equal to said cost;
    Monitor a sharing of said document by the first user to a second user, wherein said second user has an account;
    Credit a first portion of said cost back to the account of the first user; and
    Debit a second portion of said cost from the account of the second user.

2. The non-volatile computer readable medium of claim 1 wherein the first portion of said cost is equal to half of the cost.

3. The non-volatile computer readable medium of claim 1 wherein the second portion of said cost is equal to half of the cost.

4. The non-volatile computer readable medium of claim 1 wherein the plurality of characteristics includes at least one of a number of pages, a description of colors used, or a print resolution.

5. The non-volatile computer readable medium of claim 1 wherein said programmatic instructions, when executed by a processor, further cause a printer system to:
  Monitor a sharing of said document by the second user to a third user, wherein said third user has an account;
  Credit a third portion of said cost back to the account of the first user;
  Credit a fourth portion of said cost back to the account of the second user; and
  Debit a fifth portion of said cost from the account of the third user.

6. The non-volatile computer readable medium of claim 1 wherein the account of the first user and the account of the second user comprise a plurality of points and wherein said points are increased or decreased based upon said crediting or debiting of cost.

7. The non-volatile computer readable medium of claim 1 wherein said programmatic instructions, when executed by a processor, cause a printer system to debit an account of a user whenever said user receives the document shared by said first user or second user.

8. The non-volatile computer readable medium of claim 1 wherein said programmatic instructions, when executed by a processor, cause a printer system to credit the accounts of the first user and second user whenever said second user shares the document with another user.

9. The non-volatile computer readable medium of claim 1 wherein said programmatic instructions, when executed by a processor, cause a printer system to credit the account of the first user, and not the account of the second user, whenever said first user shares the document with another user.

10. A non-volatile computer readable medium storing a plurality of programmatic instructions, wherein said programmatic instructions, when executed by a processor, cause a printer system to:
  Receive a request for information about a print job from a first user having an account;
  Determine a plurality of print characteristics for said print job;
  Determine a cost of said print job;
  Present to the first user with a calculation of a cost for said print job;
  Monitor a print job for a document from one or more printers, wherein said print job is defined by a plurality of characteristics and wherein said print job is associated with the first user's account;
  Debit the account of said first user by an amount equal to said cost;
  Monitor a sharing of said document to a second user, wherein said second user has an account;
  Credit a first portion of said cost back to the account of the first user; and
  Debit a second portion of said cost from the account of the second user.

11. The non-volatile computer readable medium of claim 10 wherein the first portion of said cost is equal to half of the cost.

12. The non-volatile computer readable medium of claim 10 wherein the second portion of said cost is equal to half of the cost.

13. The non-volatile computer readable medium of claim 10 wherein the plurality of characteristics includes at least one of a number of pages, a description of colors used, or a print resolution.

14. The non-volatile computer readable medium of claim 10 wherein said programmatic instructions, when executed by a processor, further cause a printer system to:
  Monitor a sharing of said document by the second user to a third user, wherein said third user has an account;
  Credit a third portion of said cost back to the account of the first user;
  Credit a fourth portion of said cost back to the account of the second user; and
  Debit a fifth portion of said cost from the account of the third user.

15. The non-volatile computer readable medium of claim 10 wherein said programmatic instructions, when executed by a processor, cause a printer system to debit an account of a user whenever said user receives the document shared by said first user or second user.

16. The non-volatile computer readable medium of claim 10 wherein said programmatic instructions, when executed by a processor, cause a printer system to credit the accounts of the first user and the second user whenever said second user shares the document with another user.

17. The non-volatile computer readable medium of claim 16 wherein said programmatic instructions, when executed by a processor, cause a printer system to credit the account of the first user, and not the account of the second user, whenever said first user shares the document with another user.

18. A non-volatile computer readable medium storing a plurality of programmatic instructions, wherein said programmatic instructions, when executed by a processor, cause a printer system to:
  Monitor a print job for a document from one or more printers, wherein said print job is defined by a plurality of characteristics and wherein said print job is associated with an account of a first user;
  Debit the account of said first user by an amount equal to said cost;
  Monitor a communication from a second user to a third user, wherein said communication directs the third user to obtain the document from the first user and wherein said second user has an account;
  Monitor a sharing of said document from the first user to the third user, wherein said third user has an account;
  Credit a first portion of said cost back to the account of the first user;
  Credit a second portion of said cost to the account of the second user; and
  Debit a third portion of said cost from the account of the third user.

19. The non-volatile computer readable medium of claim 18 wherein the plurality of characteristics includes at least one of a number of pages, a description of colors used, or a print resolution.

20. The non-volatile computer readable medium of claim 18 wherein said programmatic instructions, when executed by a processor, cause a printer system to credit an account of the first user and second user whenever said second user shares the document with another user and wherein said programmatic instructions, when executed by a processor, cause a printer system to credit an account of the first user, and not said second user, whenever said first user shares the document with another user.

* * * * *